ATTORNEYS

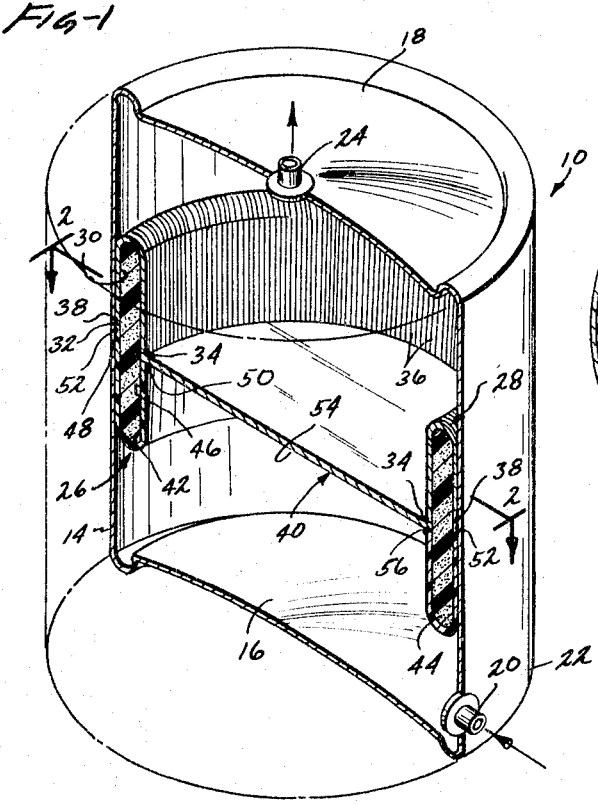
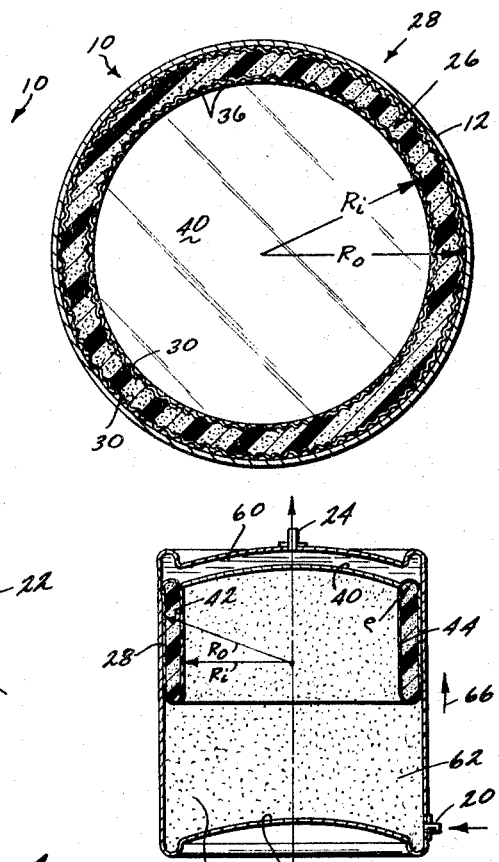
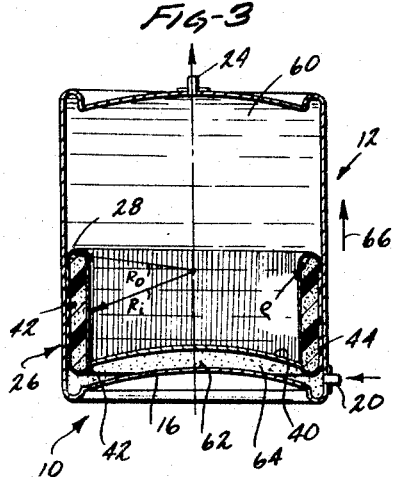
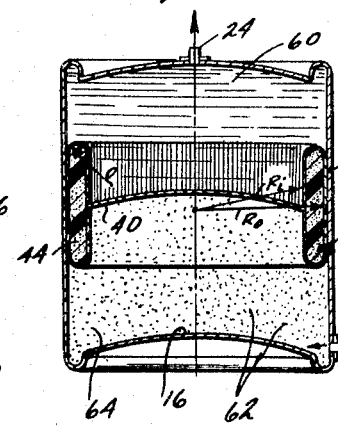
INVENTORS
PATRICK J. CUNNINGHAM
DANIEL H. PLATUS
FRANK A. MAROVICH
GEORGE EPSTEIN
BY Herzig, Walter Blackburn
ATTORNEYS INVENTORS
PATRICK J. CUNNINGHAM
DANIEL H. PLATUS
FRANK R. MARQUICH
GEORGE EPSTEIN

INVENTORS
PATRICK J. CUNNINGHAM
DANIEL H. PLATUS
FRANK A. MAROVICH
GEORGE EPSTEIN

BY Herzig, Walsh & Blackham
ATTORNEYS

United States Patent Office 3,321,112
Patented May 23, 1967

3,321,112
ROLLING CYLINDRICAL DIAPHRAGM MEANS
Patrick J. Cunningham, Fullerton, Daniel H. Platus, Playa Del Rey, Frank A. Marovich, Hacienda Heights, and George Epstein, Los Angeles, Calif., assignors to ARA, Inc. (Aerospace Research Associates), West Covina, Calif., a corporation of California
Filed Oct. 18, 1965, Ser. No. 497,134
10 Claims. (Cl. 222—386.5)

The present invention relates to a new and useful rolling cylindrical diaphram means and more particularly to a metallic cylindrical, corrugated member having an encompassing sidewall provided with axially-extending corrugations making the member flexible to bending about an axis perpendicular to the corrugations without substantially reducing the percent elongation of the member.

It is well known how to make many types of diaphragms out of organic materials for performing various functions in a number of different types of environments. While generally satisfactory, such diaphragms have the disadvantage that they become contaminated and decomposed when subjected to the deleterious effects of certain fluids and other conditions, such as extremely high or low temperatures, in the surrounding medium. This disadvantage has been overcome by providing metal foil diaphragms of the bellows type.

While generally satisfactory, the bellow type diaphragm also has certain disadvantages.

One disadvantage resides in the fact that the nested length required for the bellows must be taken into consideration when working out the design parameters for a system employing such a diaphragm.

Another disadvantage resides in the fact that the bellows-type diaphragm contributes substantially to the total weight of the system in which it is employed, as compared to the diaphragm of the present invention.

In view of the foregoing factors and conditions characteristic of organic and bellows-type diaphragms, it is the primary object of the present invention to provide a new and useful diaphragm not subject to the disadvantages enumerated above and having an encompassing sidewall provided with axially-extended corrugations especially designed for making the diaphragm flexible to bending about an axis perpendicular to the corrugations without substantially reducing the percent elongation of the diaphragm.

Another object of the present invention is to provide a new and useful rolling, metallic, cylindrical diaphragm suitable for use as a seal between telescoping cylinders, for joining conical or spherical caps to cylinders, or for use as expulsion bladders in liquid-propellant tanks and the like.

A further object of the present invention is to provide a new and useful expulsion bladder in combination with a liquid-propellant tank.

Although the rolling, cylindrical diaphragm means of the present invention may be used in many different combinations which will manifest themselves to those skilled in the art, it will be described herein for purposes of illustration, but not of limitation, as comprising an expulsion bladder in combination with a cylindrical, liquid-propellant tank having an encompassing sidewall, a closed bottom wall and a closed top wall. The tank is provided with a pressurizing gas inlet adjacent its bottom wall and a liquid outlet in its top wall.

A metallic, cylindrical, corrugated, rolling diaphragm having an encompassing sidewall provided with axially-extending corrugations has its upper end affixed to the inner periphery of the encompassing sidewall of the tank intermediate its ends. The othed end of the diaphragm is attached to a rigid piston which is positioned immediately superjacent the bottom wall when the tank is full. The diaphragm and piston combination forms a fluid-tight, flexible, inner container for a liquid to be dispensed from the tank by gas pressure acting on the piston.

The diaphragm comprises a finely corrugated metal foil with the amplitude of the corrugations being such that the diaphragm is flexible to bending about an axis perpendicular to the corrugations without substantially reducing the percent elongation of the diaphragm.

Since the thin foil can not accommodate in-plane compressive stresses, it must be maintained in tension. This is accomplished by providing a tensioning diaphragm on the gas side of the tank which encases an annular, rigid filler material providing a uniform fold radius to minimize bending stresses in the diaphragm. The filler material also provides a rigid bearing surface to eliminate dynamic loads on the diaphragm from liquid sloshing.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a longitudinal cross-sectional view in perspective showing a diaphragm of the present invention in combination with a liquid-propellant tank for use as an expulsion bladder;

FIGURE 2 is a transverse cross-sectional view taken along line 2—2 of FIGURE 1;

FIGURES 3–5 are diagrammatic views illustrating an expulsion sequence for the combination of FIGURE 1;

Figure 6:
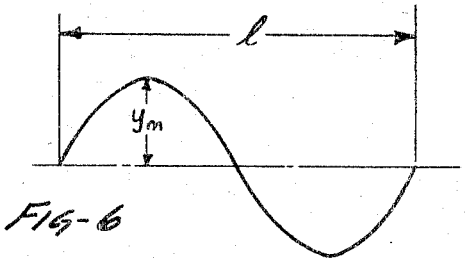
FIGURES 6 and 7 are graphs of a sinusoidal corrugation wave form and a circular corrugation wave form, respectively.

Referring again to the drawings and particularly to FIGURES 1–5, a rolling cylindrical diaphragm means and tank combination of the present invention, generally designated 10, includes a liquid expulsion tank 12 which may be made from any suitable rigid material and which is shown herein for purposes of illustration, but not of limitation, as being made of metal. The tank 12 includes an encompassing sidewall 14, a closed bottom wall 16 and a closed top wall 18. A pressurizing-gas inlet 20 is provided in the lower end 22 of the tank 12 superjacent the bottom wall 16 for admitting a suitable gas under pressure to the tank 12 for the purpose of expelling a liquid therefrom in a manner to be hereinafter described. The tank 12 is also provided with a liquid outlet 24 which may be mounted in the top wall 18 for the outflow of this expelled liquid. Suitable means for expelling liquid from tank 12, generally designated 26, is also provided therein. The means 26 includes a thin, foil-type, rolling, cylindrical diaphragm means 28 forming a flexible seal in the tank 12. The diaphragm means 28 includes an encompassing sidewall 30, and open top 32 and an open bottom 34. The diaphragm means 28 is made flexible to bending with no reduction in its percent elongation by providing it with a plurality of closely spaced, small, shallow, axially-extending corrugations 36 and is capable of reversibly rolling on itself expanding radially from an inner radius $R_i$ to an outer radius $R_o$ (FIGURE 2) as a result of the flexibility permitted by these shallow corrugations. The open end 32 is attached to the tank wall 14 by a suitable weldment 38 approximately midway between the bottom wall 16 and the top wall 18. The open bottom 34 is attached to a rigid piston 40 which is reciprocally mounted in the tank 12 as a component of the means 26, thereby forming a fluid-tight, flexible, inner container within the tank 12. When gas under pressure is admitted to the tank 12 through the pressurizing gas inlet 20, gas pressure acts on the piston 40 moving it upwardly within the tank 12 in cooperation with diaphragm means 28 to expel liquid from the tank 12.

For most applications of interest involving tanks up to several feet in diameter, the diaphragm means 28 is preferably made from a thin, metallic foil having a wall thickness $h$ of the order of 0.0005 to 0.005 inch. Since a foil this thin cannot accommodate in-plane compressive stresses, the diaphragm means 28 must be maintained in tension. This is accomplished by providing the means 26 with a cylindrical tensioning diaphragm 42 which is located on the gas side of the means 26 and which encases a rigid, annular filler 44 made of a plastic foam or like material. The tensioning diaphragm 42 includes an encompassing sidewall 46, an open top 48 and an open bottom 50. The open top 48 is secured to the sidewall 14 of tank 12 by a suitable weldment 52 and to the underside 54 of piston 40 by a weldment 56. The rigid filler 44 provides a uniform fold radius $\rho$ for the diaphragm means 28 to minimize bending stresses therein and to also provide a rigid bearing surface for minimizing dynamic loads on the diaphragm 28 from liquid sloshing. The tensioning diaphragm 42 may be conveniently made from a pliable plastic or elastomer and the open top 48 is abutted against the open bottom 32 of the diaphragm 28 and sealed thereto. It should be noted that the wall thickness of the diaphragm means 28 would increase as the size of the tank 12 is increased. Thus, metallic sheet of the order of 0.02 to 0.10 inch could be used for tanks 50 to 100 feet in diameter.

FIGURES 3–5 illustrate a liquid expulsion sequence diagrammatically. FIGURE 3 represents a tank 12 which is full of liquid 60 which may be expelled therefrom by admitting a gas 62 into the tank 12 through the inlet 20 into a chamber 64 formed between the piston 40 and the bottom wall 16. The gas 62 acts on piston 40 to move it upwardly in the direction of arrow 66 causing liquid 60 to be expelled through the liquid outlet 24. As the piston 40 moves upwardly in tank 12, the diaphragm means 28 bends about an axis perpendicular to the corrugations 36 causing the diaphragm means 28 to roll inside out, expanding radially from an inner radius $R_i$ to an outer radius $R_o$ corresponding to the tank wall. The diaphragm 28 is sufficiently flexible to elongate circumferentially as it rolls inside out. Gas pressure acting on the tensioning diaphragm 42 and the rigid filler 44 maintains constant tension on the thin diaphragm means 28. It is apparent from FIGURE 5 that the expulsion efficiency of the device 10 is essentially 100 percent which is substantially greater than can be obtained with a bellows-type expulsion device which is limited by the nested length required for the bellows.

Rolling of the diaphragm means 28 produces strain in two mutually perpendicular directions. Expansion from the inner radius $R_i$ to the outer radius $R_o$ produces bending strain in the circumferential direction ($\epsilon_2$) as the corrugations 36 are stretched open. In addition, bending of the diaphragm means 28 around the fold radius as it turns inside-out produces strains in the perpendicular direction ($\epsilon_1$). The magnitude of these strains as a function of tank and diaphragm configurations is estimated as follows:

Assume that the corrugations 36 are sinusoidal in shape with wavelength $l$ and amplitude $y_m$ as shown in FIGURE 6. The unfolded length $L$ of the diaphragm means 28 for one wave is given by $$L = \int_0^1 \sqrt{1 + y'^2}\, dx \qquad (1)$$

where $$y = y_m \sin \frac{2\pi x}{l} \qquad (2)$$

Differentiating Equation 2 and making the change of variable $$\xi = \frac{2\pi x}{l} = \frac{b}{y_m} x \qquad (3)$$

Equation 1 may be written $$\frac{L}{l} = \frac{2}{\pi} \int_0^{\pi/2} \sqrt{1 + b^2 \cos^2 \xi}\, d\xi$$
$$= \frac{2}{\pi} \sqrt{1+b^2} \int_0^{\pi/2} \sqrt{1 - \left(\frac{b^2}{1+b^2}\right) \sin^2 \xi}\, d\xi \qquad (4)$$

The integral of Equation 4 is the complete elliptic integral of the second kind, $E(k)$, of argument $$k = \frac{b}{\sqrt{1+b^2}}$$

Thus, the ratio of the unfolded to the folded length is given by $$\frac{L}{l} = \frac{2}{\pi} \sqrt{1+b^2}\, E\!\left(\frac{b}{\sqrt{1+b^2}}\right) \qquad (5)$$

If the wavelength $l$ corresponding to the diaphragm's inner radius $R_i$ is $l_i$, and that corresponding to the outer radius $R_o$ is $l_o$, then the ratio of radii must equal the corresponding ratio of wavelengths. From Equation 5

$$\frac{R_o}{R_i} = \frac{R_o}{R_o - 2\rho} = \frac{l_o}{l_i} = \frac{\sqrt{1+b_i^2}}{\sqrt{1+b_o^2}} \cdot \frac{E\!\left(\dfrac{b_i}{\sqrt{1+b_i^2}}\right)}{E\!\left(\dfrac{b_o}{\sqrt{1+b_o^2}}\right)} \qquad (6)$$

Equation 6 relates the fold radius $\rho$ of the diaphragm means 28 to the corrugation amplitude $y_m$ through the parameter $b$ defined in Equation 3 by the relation $$b = \frac{2\pi y_m}{l}$$

The bending strain $\epsilon_1$ corresponding to the fold radius $\rho$ and amplitude $y_m$ is $$\epsilon_1 = \frac{y_m + h/2}{\rho} \qquad (7)$$

where $h$ is the foil thickness.

The bending strain $\epsilon_2$ in the circumferential direction is simply $$\epsilon_2 = \frac{h}{2r} \qquad (8)$$

where $1/r$ is the maximum curvature of the sinusoidal corrugations and is obtained from Equation 2 according to $$\frac{1}{r} = \left. \frac{\dfrac{d^2y}{dx^2}}{\left[1 + \left(\dfrac{dy}{dx}\right)^2\right]^{3/2}} \right|_{x=\frac{1}{4}} = \frac{4\pi^2 y_m}{l^2} \qquad (9)$$

Thus, $$\epsilon_2 = \frac{2\pi^2 y_m h}{l^2} \qquad (10)$$

Figure 7:
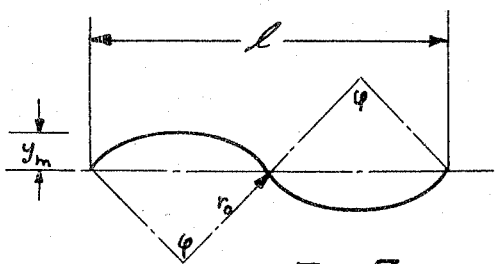

For a circular wave form as shown in FIGURE 7, the ratio of the unfolded to the folded length is given by $$\left(\frac{L}{l}\right)_c = \frac{\varphi}{4 \sin \varphi/2} \tag{11}$$

where $\varphi$ defines the sector of circular arc forming the half-wave. The half-amplitude, in this case, is $$y_{mc} = r_c(1 - \cos \varphi/2)$$

where $r_c$ is the radius of the circular corrugations. The equation which relates the fold radius $\rho$ and half-amplitude $y_{m'}$ corresponding to Equation 6 for the sinusoidal wave form, is $$\frac{R_o}{R_i} = \frac{R_o}{R_o - 2\rho} = \frac{l_o}{l_i} = \frac{\varphi_i \sin \varphi_o/2}{\varphi_o \sin \varphi_i/2} \tag{13}$$

where the angles $\varphi_o$ and $\varphi_i$ correspond to $l_o$ and $l_i$, respectively. The half-amplitude $y_m$ is related to $\varphi$ through Equation 12, and Equations 7 and 8, as before, define the bending strains in the two mutually perpendicular directions.

Figure 8:
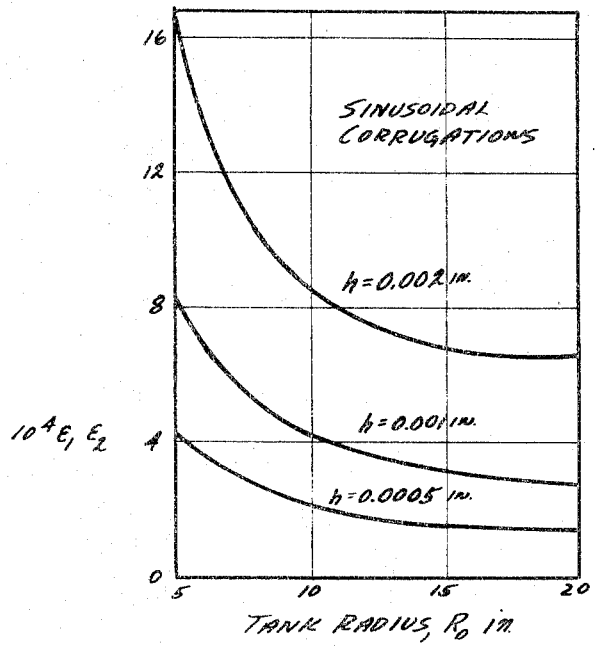
FIGURE 8 is a graph showing the product of principal strains vs. tank radius for various foil thicknesses.
Figure 9:
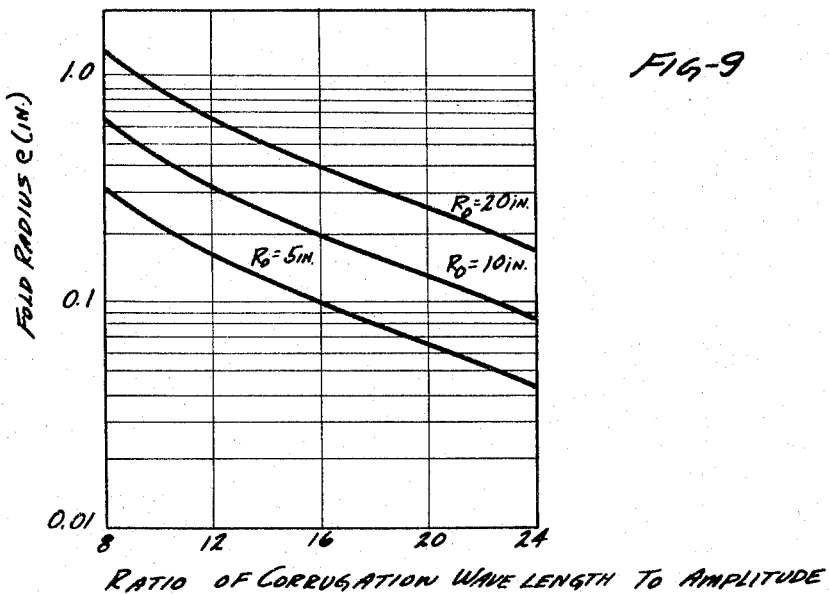
FIGURE 9 is a graph showing fold radius as a function of corrugation dimensions for various tank radii.

The magnitude of the strains required in the diaphragm means 28 for typical tank configurations may be examined in connection with FIGURE 8 which shows the product $\epsilon_1 \epsilon_2$ of the principal strains for the sinusoidal corrugations as a function of the tank radius for various foil thicknesses. For simplicity, it may be assumed that the corrugations are completely unfolded in the position corresponding to the radius $R_o$. The product of strains is independent of corrugation dimensions for very shallow corrugations with wavelength-to-amplitude ratios greater than about 10 or 12. The values shown in FIGURE 8 correspond to shallow waves in this range. For less shallow corrugations, the strains increase with decreasing wavelength-to-amplitude ratio. For this ratio equal to about 6, the strain product is approximately 25% greater than the value corresponding to a wavelength-to-amplitude ratio of about 12. FIGURE 9 shows the fold radius $\rho$ as a function of the wavelength-to-amplitude ratio for various tank radii. The fold radius is approximately proportional to the corrugation amplitude for constant strain $\epsilon_1$.

For the circular corrugations, the strain component $\epsilon_1$ is also described by Equation 7, where $y_m$ in this case is given by Equation 12. Instead of assuming, as with the sinusoidal corrugations, that the corrugations are stretched completely flat in the position corresponding to the tank radius $R_o$, it may be assumed that the corrugations initially are of radius $r_i$ and angle $\varphi_i$ corresponding to the seal position $R_i$, and are of radius $r_o$ and $\varphi_o$ at the seal position $R_o$. As the corrugations stretch open, the arc length must remain constant and the corrugation dimensions must satisfy the relation.

$$r_i \varphi_i = r_o \varphi_o \tag{14}$$

The strain component $\epsilon_2$ is then proportional to the change in curvature corresponding to the two positions and is given by $$\epsilon_2 = \frac{h}{2}\left(\frac{1}{r_i} - \frac{1}{r_o}\right) = \frac{h}{2r_i}\left(1 - \frac{r_i}{r_o}\right) \tag{15}$$

The strain components $\epsilon_1$ in the position $R_i$, from Equations 7 and 12, ignoring the foil sheet half-thickness $h/2$ compared with the corrugation amplitude $y_{m'}$ is $$\epsilon_1 = \frac{\eta}{\rho}\left(1 - \cos \frac{\varphi_i}{2}\right) \tag{16}$$

The product of strain, multiplying Equations 15 and 16 are using the relation Equation 14, is $$\epsilon_1 \epsilon_2 = \frac{h}{2\rho}\left(1 - \cos \frac{\varphi_i}{2}\right)\left(1 - \frac{\varphi_o}{\varphi_i}\right) \tag{17}$$

The foil radius $\rho$ may be obtained from Equation 13 in terms of the tank radius $R_o$ and the corrugation angles $\varphi_i$ and $\varphi_o$. This gives for the product of strains $$\epsilon_1 \epsilon_2 = \frac{h}{R_o} \frac{\left(1 - \cos \frac{\varphi_i}{2}\right)\left(1 - \frac{\varphi_o}{\varphi_i}\right)}{\left[1 - \frac{\varphi_o}{\varphi_i} \frac{\sin \varphi_i/2}{\sin \varphi_o/2}\right]} \tag{18}$$

The sine and cosine expressions may be approximated reasonably well by the first two terms in their series expansions since the maximum value for $\varphi_i/2$ is $\pi/2$. These functions may be written $$\cos \varphi/2 \approx 1 - \varphi^2/8$$
$$\sin \varphi/2 \approx \varphi/2 - \varphi^3/48 \tag{19}$$

which gives for $\epsilon_1 \epsilon_2$ from Equation 18

$$\epsilon_1 \epsilon_2 = \frac{h}{8R_o} \frac{(24 - \varphi_o^2)}{(1 + \varphi_o/\varphi_i)} \tag{20}$$

In the limit as the corrugations stretch completely flat, $r_o$ is infinite and $\varphi_o = o$, and $\epsilon_1 \epsilon_2$ has the limiting value of $3h/R_o$. For any other degree of stretching short of completely flat (which could never be realized in practice) $\varphi_o/\varphi_i$ is a fraction and $\varphi_o^2$ is relatively small. Consequently, the limiting value $$\epsilon_1 \epsilon_2 \leq \frac{3h}{R_o} \tag{21}$$

is applicable for a first order approximation.

With the approximation of Equation 19, Equation 13 may be written $$\varphi_i^2 = \left(1 - \frac{2\rho}{R_o}\right)\varphi_o^2 + \frac{48\rho}{R_o} \tag{22}$$

which for $\varphi_o^2 = 0$, gives the limiting value for $\varphi$;

$$\varphi_i = \sqrt{\frac{48\rho}{R_o}} \tag{23}$$

If it is desired that $\epsilon_1$ and $\epsilon_2$ be equal in order to minimize strain, then Equations 15 and 16 with the approximation of Equation 19, give $$\frac{r_i^2}{4h\rho} = \frac{\varphi_i - \varphi_o}{\varphi_i^3} \tag{24}$$

For $\varphi_o = 0$ and $\varphi_i$ given by Equation 23, the limiting value of $r_i$ from Equation 24 is $$r_i = \sqrt{\frac{hR_o}{12}} \tag{25}$$

In practice, $r_i$ must be less than the value given by Equation 25 in order to permit sufficient elongation of the foil in the circumferential direction in folding about the radius $\rho$. For a specified $r_i$, $\varphi_i$ and $\varphi_o$ are obtained from Equations 22 and 24, and the product of strains is obtained from Equation 20.

In order to demonstrate the magnitude of the strains required and the foil dimensions for a typical tank configuration, consider a tank of radius $R_o = 10$ in. with a foil thickness $h = 0.001$ in. and a fold radius $\rho = 0.375$ in. The corrugation dimensions and product of strains are given in Table 1 for different corrugation radii, including the maximum corrugation radius such that the principal strain components are equal. For a corrugation radius $r_i = 0.020$ in., for example, the product of strains is $2.08 \times 10^{-4}$, which gives approximately 1.4% strain for each of the principal strain components. For stainless steel foil, this strain range would permit approximately 2000

TABLE 1.—CORRUGATION DIMENSIONS AND STRAINS REQUIRED FOR TYPICAL EXPULSION TANK CONFIGURATION ($R_o = 10$I N., $H = 0.001$ IN., $\rho = 0.375$ IN.)

| $r_i$ (in.) | $\phi_i$ (degrees) | $\phi_o$ (degrees) | $10^4 \epsilon_1 \epsilon_2$ |
|---|---|---|---|
| 0.010 | 110 | 81.8 | 1.51 |
| 0.020 | 84.3 | 36.0 | 2.08 |
| 1 0.0289 (max.) | 76.9 | 0 | 3.00 | cycles before fatigue failure. Even with a strain concentration factor of 3, the fatigue life should exceed 200 cycles.

It should be noted that the strain component $\epsilon_1$ was calculated for the diaphragm means 28 in the position $R_1$ where the corrugation amplitude is maximum. As the diaphragm means 28 is stretched over the fold radius $\rho$, it must expand circumferentially with a resultant decrease in corrugation amplitude. Consequently, the strain component $\epsilon_1$ diminishes if the fold radius remains constant. It is seen that if the fold radius is not constant but is varied such that the curvature is a minimum at $R_1$ where the corrugations are maximum, and increases to a maximum at the tank wall 14 where the corrugations are minimum, the strain component $\epsilon_1$ can be maintained at a constant value lower than that calculated above.

A test was devised to demonstrate the feasibility of a rolling metallic diaphragm under conditions typical of what would be required in an expulsion tank. The main purpose of the test was to establish that the thin metal diaphragm could undergo a reasonable number of strain cycles without the formation of sharp creases and the resultant failure from strain concentrations. A stainless-steel, foil-type diaphragm was constructed and successfully underwent three complete "fluid expulsion cycles" or six complete strain cycles before any failure of the foil was detected.

The selection of the test configuration was based on the preliminary analysis described above in connection with FIGURES 6–9. Although certain design parameters are limited by geometry alone, other parameters are somewhat arbitrary in view of the complexity of the non-linear, inelastic, large deformations produced in bending a corrugated metal foil sheet in the manner described. The strain product $\epsilon_1\epsilon_2$, for example, was estimated at a first order indication of the magnitude of straining, assuming the foil deforms in the idealized manner proposed in the analysis. It was apparent, however, that buckling instabilities could occur in view of the existence of compressive stresses and the small foil thicknesses required. Consequently, without a detailed buckling analysis, the product $\epsilon_1\epsilon_2$ can only be set at an arbitrarily low value. From FIGURE 8, it is seen that ½-mil foil gives a minimum value for this strain product of approximately $2 \times 10^{-4}$, or about 1.4% for each strain component, for a 10-in. radius tank. After some preliminary testing of ½-mil stainless steel foil, it was decided to use 1-mil foil for the test because of the difficulty in handling ½-mil foil due to its susceptibility to wrinkling. It is noted from FIGURE 8 for 1-mil foil that the strain product decreases rapidly with tank radius at a radius of 5 in., and decreases less rapidly beyond 10 in. At 10 in., the strain product is about $4 \times 10^{-4}$ or 2% for each component. Because a larger tank would be more cumbersome to work with, and in view of the little reduction in $\epsilon_1 \epsilon_2$ with increasing radius, 10 in. was used for the test configuration. Although the curves of FIGURE 8 were computed on the basis of sinusoidal corrugations, the results apply to circular corrugations to a first order approximation.

The remaining parameters to be specified are the corrugation dimensions and the fold radius. Referring to Equation 25, it is seen, for $h=0.001$ in. and $R_0=10$ in., with the condition $\epsilon_1\epsilon_2$, that the maximum value of $r_1$, the corrugation radius before folding, is 0.029 in. This result is independent of the fold radius $\rho$ up to a limiting value determined from Equation 23 with $\varphi_1=\pi$, and assumes that the corrugations are stretched completely flat. In order that the stretching forces be tolerable, the corrugation radii were specified in the range 0.020 in. to 0.025 in. The exact dimensions could not be precisely specified because of fabrication reasons which will be hereinafter discussed. It still remained to specify the corrugation wavelength or the angles $\varphi_1$ and $\varphi_0$, which are related to the fold radius $\rho$ through Equation 22. It was intended to vary the angle $\varphi_1$, and therefore the fold radius, by form-rolling corrugations into the foil and changing the degree of engagement of the rollers. However, this would produce circular corrugations only when the rollers were completely engaged, since partial engagement would produce sawtooth corrugations with rounded peaks. Therefore, it was decided to specify the tooth form of the rollers such that the maximum corrugation amplitude with the rollers completely engaged would correspond to a fold radius of ⅝ in. for the 10-in. radius tank. For any smaller fold radius, the corrugations could be stretched to give the desired smaller amplitudes.

The rollers, as machined, consisted of 0.020 in. radius circular teeth on a 0.0686 in. spacing. The 0.020-in. tooth radius allows for "spring-back" of the foil after rolling. The degree of spring-back will be estimated hereinafter in connection with a discussion of FIGURES 11 and 12.

Figure 10:
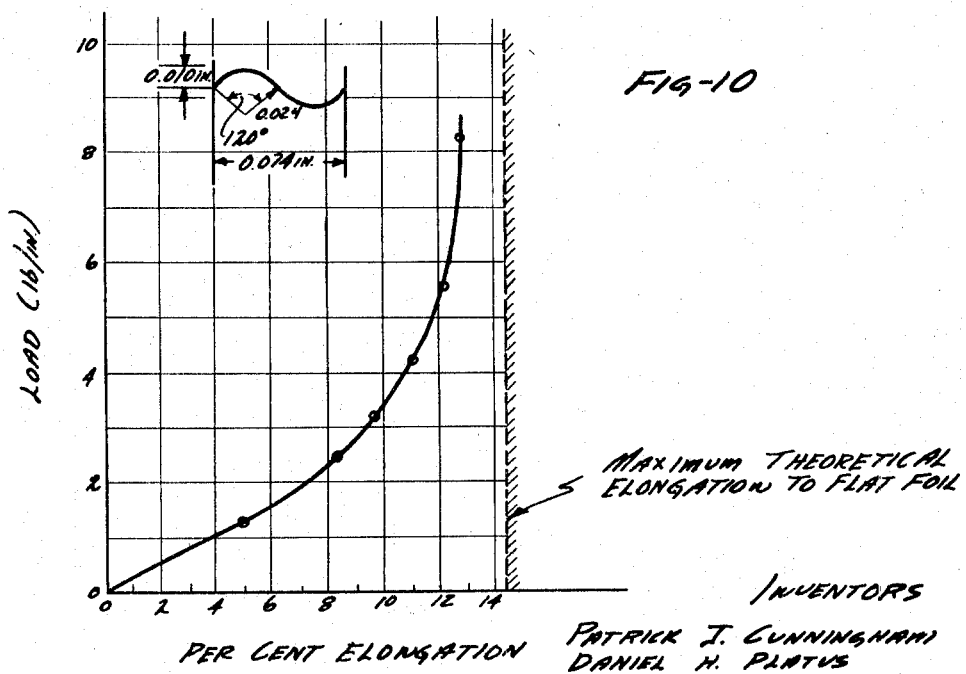
FIGURE 10 is a load-deflection curve for a 0.001-inch thick stainless steel foil.

After corrugating samples of foil, load-deflection tests were conducted to determine the percent elongation which could be practically obtained. FIGURE 10 shows a typical load-deflection curve for a 0.001-in. thick sample having an average corrugation half-amplitude of 0.010 in. The corrugation dimensions indicated in FIGURE 10 are approximate dimensions based on a circular wave form. The actual corrugations deviate somewhat from circular due to some stretch forming of the foil. It is seen from FIGURE 10 that an elongation of 12 to 13% can be achieved without excessive loading. This corresponds to a maximum fold radius of approximately ⅝ in. for the 10-in. radius tank configuration.

In addition to the force-deflection tests, bend tests were conducted to determine the stability of the foil in bending about an axis perpendicular to the corrugations. Samples of corrugated foil were bent around a 5/16-in. radius rod. For this radius of curvature, the bending strain corresponding to 0.010-in. half-amplitude corrugations is 3.2% assuming the neutral axis is symmetrically located. Some flattening of the corrugations occurred during bending for lack of lateral restraint. However, even for strains on the order of 2% there was no detectable buckling instability. These samples were bent around the rod by hand using sheets of soft rubber to apply a uniform lateral pressure. It was found that the foil could also be bent without buckling by maintaining a steady tension on the foil in a direction parallel to the corrugations.

Figure 11:
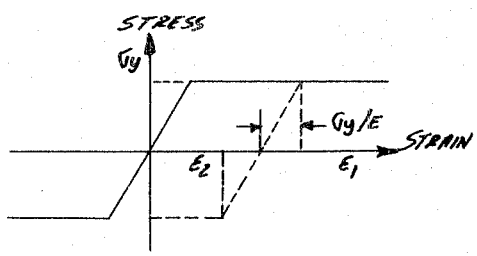
FIGURE 11 is an idealized, elastic-plastic stress-strain curve which may be used for estimating the degree of "spring back" during the forming of corrugations in thin, metallic foil.

Because of the recoverable elastic deformation in form-rolling corrugations in thin metallic foil, the corrugation dimensions will differ from the tooth dimensions of the rollers. The degree of "spring-back" can be estimated using an idealized elastic-plastic stress-strain curve as shown in FIGURE 11.

Figure 12:
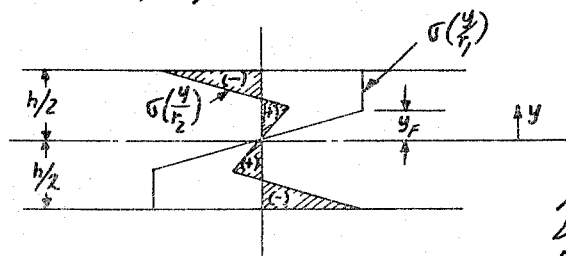
FIGURE 12 is a graphical representation of stress distributions before and after springback.

Consider bending foil of thickness $h$ around an initial radius of curvature $r_1$ such that after spring-back, the radius of curvature is $r_2$. The stress distributions throughout the cross-section of the foil before and after spring-back will be as shown in FIGURE 12 and the distribution corresponding to $r_2$ must be such that the first moment of the stresses about the neutral axis is zero. This moment may be written $$M = 2\int_0^{h/2} y\sigma\left(\frac{y}{r_2}\right)dy = 2\int_0^{y_E} y\sigma_E dy + 2\int_{y_E}^{h/2} y\sigma_P dy \quad (26)$$

where $\sigma_E$ and $\sigma_P$ are stresses in the elastic and plastic regions and are defined by $$\sigma_E = \frac{Ey}{r_2}; \quad \sigma_P = \sigma_y - E\left(\frac{y}{r_1} - \frac{y}{r_2}\right) \quad (27)$$

Substituting Equation 27 in Equation 26 and integrating, there is obtained $$M = \frac{2}{3}\frac{E}{r_2}y_E^3 + \sigma_y\left(\frac{h^2}{4} - y_E^2\right) - \frac{2E}{3}\left(\frac{1}{r_1} - \frac{1}{r_2}\right)\left(\frac{h^3}{8} - y_E^3\right) \quad (28)$$

where $y_E$ is the distance from the neutral axis at which yielding first occurs and is given by $$y_E = \frac{\sigma_y r_1}{E} \quad (29)$$

Substituting Equation 29 in Equation 28 and setting the moment equal to zero, there is obtained $$\frac{1}{r_1} - \frac{1}{r_2} = \frac{3\sigma_y}{Eh} - \frac{4\sigma_y^3 r_1^2}{E^3 h^3} \quad (30)$$

Thus, for a given form radius $r_1$, the radius $r_2$ of the corrugated foil after spring-back can be obtained from Equation 30. This analysis, however, neglects the variation in stress-strain behavior due to the Bauschinger effect, which occurs on complete stress or strain reversals.

While the particular rolling cylindrical diaphragm means herein shown and described in detail is fully capable of attaining the objects and providing the advantages hereinbefore stated, it is to be understood that it is merely illustrative of the presently preferred embodiment of the invention and that no limitations are intended by the details of construction or design herein shown other than as defined in the appended claims.

What is claimed is:

1. In combination: means defining a substantially rigid hollow first cylinder and rolling diaphragm means within said hollow cylinder intermediate the ends thereof, said rolling diaphragm means comprising; a second cylinder of thin sheet metal having one end thereof sealingly secured to the inner face of said first cylinder, said second cylinder being corrugated throughout its periphery with the corrugations extending axially substantially from end to end thereof, a first end portion of said second cylinder adjacent said one end lying against the wall of said first cylinder and extending axially therealong in one axial direction then being reversely folded inwardly to extend in the opposite axial direction in inwardly spaced relation to said first end portion; and closure means closing the other end of said second cylinder whereby said closure means may be moved axially of said first cylinder and thereby roll the folded portion of said second cylinder along the inner face of said first cylinder.

2. The combination defined in claim 1 including means between said first end portion and said inwardly spaced portion holding said inwardly spaced portion against radial movement outwardly toward said first end portion.

3. In combination: means defining a substantially rigid hollow first cylinder and rolling diaphragm means within said hallow cylinder intermediate the ends thereof, said rolling diaphragm means comprising; a second cylinder of thin sheet metal having one end thereof sealingly secured to the inner face of said first cylinder, a first end portion of said second cylinder adjacent said one end lying against the wall of said first cylinder and extending axially therealong in one axial direction then being reversely folded inwardly to extend in the opposite axial direction in inwardly spaced relation to said first end portion; at least said inwardly spaced portion of said second cylinder and said reversely folded portion thereof being corrugated throughout its periphery with the said corrugations extending axially of said second cylinder; and closure means closing the other end of said second cylinder whereby said closure means may be moved axially of said first cylinder and thereby roll the folded portion of said second cylinder along the inner face of said cylinder.

4. The combination defined in claim 3 including means between said first end portion and said inwardly spaced portion holding said inwardly spaced portion against radial movement outwardly toward said first end portion.

5. In combination with a liqiud expulsion tank having an encompassing sidewall, a closed top wall, a closed bottom wall, a liquid outlet and a pressurizing gas inlet, liquid expulsion means, comprising:

a cylindrical, corrugated member having an encompassing sidewall provided with axially-extending corrugations, the amplitude of said corrugations being such that said member is flexible to bending about an axis perpendicular to said corrugations without substantially reducing the percent elongation of said member, said member having an encompassing sidewall, an open top and a closed bottom;

means connecting said open top of said member to said encompassing side wall of said tank intermediate said liquid outlet and said pressurizing gas inlet;

a rigid piston connected to said open bottom of said member intermediate liquid outlet and said pressurizing gas inlet for reciprocation in said tank by pressurizing gas admitted to said tank through said pressurizing gas inlet; and means provided in said tank for maintaining said member in tension to accommodate in-plane compressive stresses.

6. A combination as stated in claim 5 wherein said member is metallic.

7. A combination as stated in claim 5 wherein said member comprises a thin metallic sheet.

8. A combination as stated in claim 5 wherein said means for maintaining said member in tension includes a cylindrical, tensioning diaphragm having an encompassing sidewall, an open top and an open bottom, said open top of said tensioning diaphragm being connected to said encompassing side wall of said tank subjacent said open top of said member, said open bottom of said tensioning diaphragm being connected to said piston subjacent said open bottom of said member, said tensioning means also including an annular, rigid filler encased by said tensioning means and said member.

9. A combination as stated in claim 8 wherein said member comprises a thin metallic sheet, said tensioning means comprises a pliable plastic member and said filler comprises a plastic foam material for providing a uniform fold radius to minimize bending stresses in said member and to provide a rigid bearing surface to eliminate dynamic loads on said member from liquid sloshing.

10. A liquid expulsion system, comprising:

a tank having an encompassing side wall, a closed top wall and a closed bottom wall;

a liquid outlet provided in said top wall;

a pressurizing gas inlet provided in said tank side wall adjacent said closed bottom wall;

a metallic cylindrical, corrugated diaphragm having an encompassing side wall provided with axially-extending corrugations, the amplitude of said corrugations being such that said metallic diaphragm is flexible to bending about an axis perpendicular to said corrugations without substantially reducing the percent elongation of said metallic diaphragm, said metallic diaphragm having an open top and an open bottom;

means connecting said open top of said metallic diaphragm to said encompassing side wall of said tank intermediate said liquid outlet and said pressurizing gas inlet;

a rigid piston reciprocally mounted in said tank intermediate said top wall and said bottom wall, said piston being connected to the open bottom of said metallic diaphragm;

an annular rigid member mounted in said tank between said tank side wall and said metallic diaphragm; and a tensioning diaphragm mounted in said tank, said tensioning diaphragm having an encompassing side wall, an open top and an open bottom, means connecting said open top of said tensioning diaphragm to said tank side wall subjacent said open top of said metallic diaphragm, said open bottom of said tensioning diaphragm being connected to said piston subjacent said open bottom of said metallic diaphragm.

(References on following page)

References Cited by the Examiner

UNITED STATES PATENTS

| | | | |
|---|---|---|---|
| 3,097,766 | 7/1963 | Biehl et al. | 222—95 X |
| 3,158,296 | 11/1964 | Cornelius | 222—386.5 |
| 3,197,087 | 7/1965 | Black | 222—386.5 |

FOREIGN PATENTS 781,103    8/1957    Great Britain.

ROBERT B. REEVES, *Primary Examiner.*

STANLEY H. TOLLBERG, *Examiner.*